(12) United States Patent
Camp et al.

(10) Patent No.: US 9,272,745 B2
(45) Date of Patent: Mar. 1, 2016

(54) AUTOMATIC DROP SEATPOST

(71) Applicant: Trek Bicycle Corporation, Waterloo, WI (US)

(72) Inventors: David Camp, Canyon County, CA (US); Jose Gonzalez, Santa Clarita, CA (US)

(73) Assignee: Trek Bicycle Corporation, Waterloo, WI (US)

( * ) Notice: Subject to any disclaimer, the term of this patent is extended or adjusted under 35 U.S.C. 154(b) by 0 days.

(21) Appl. No.: 14/480,381

(22) Filed: Sep. 8, 2014

(65) Prior Publication Data

US 2015/0151804 A1  Jun. 4, 2015

Related U.S. Application Data

(62) Division of application No. 13/594,654, filed on Aug. 24, 2012, now Pat. No. 8,833,786.

(60) Provisional application No. 61/526,927, filed on Aug. 24, 2011, provisional application No. 61/609,980, filed on Mar. 13, 2012.

(51) Int. Cl.
*B62J 1/08* (2006.01)
*B62K 19/36* (2006.01)
*B62K 19/00* (2006.01)

(52) U.S. Cl.
CPC . *B62J 1/08* (2013.01); *B62K 19/00* (2013.01); *B62K 19/36* (2013.01); *B62J 2001/085* (2013.01); *Y10T 403/32237* (2015.01)

(58) Field of Classification Search
CPC ...... B62J 1/08; B62J 2001/085; B62D 19/00; B62D 19/36
USPC ............................ 280/287, 281.1; 297/281.1
See application file for complete search history.

(56) References Cited

U.S. PATENT DOCUMENTS

| | | | |
|---|---|---|---|
| 2006/0066074 A1* | 3/2006 | Turner | 280/287 |
| 2011/0097139 A1* | 4/2011 | Hsu | 403/109.1 |
| 2012/0104727 A1* | 5/2012 | Hsu | 280/287 |
| 2012/0247894 A1* | 10/2012 | Shirai | 188/322.13 |
| 2013/0093159 A1* | 4/2013 | McAndrews et al. | 280/278 |
| 2014/0061419 A1* | 3/2014 | Wehage et al. | 248/404 |

* cited by examiner

*Primary Examiner* — Tony Winner (57) ABSTRACT

An apparatus including a seat post. The seat post can include an upper post, a lower post, a first mechanical energy source, a second mechanical energy source, and a control mechanism. The first mechanical energy source can be configured to contract the lower post and the upper post. The second mechanical energy source can be configured to expand the lower post and the upper post. The control mechanism can be configured to activate the first mechanical energy source to contract the lower post and the upper post to a first predetermined position.

2 Claims, 9 Drawing Sheets

FIG. 14

AUTOMATIC DROP SEATPOST

CROSS-REFERENCE TO RELATED PATENT APPLICATIONS

This application is a Divisional of U.S. application Ser. No. 13/594,654, filed Aug. 24, 2012, which claims the benefit of U.S. Provisional Application No. 61/526,927, filed Aug. 24, 2011, and U.S. Provisional Application No. 61/609,980, filed Mar. 13, 2012, both of which are incorporated herein by reference in their entireties. This application is also related to U.S. patent application Ser. No. 13/526,372, filed on Jun. 18, 2012, which is incorporated herein by reference in its entirety.

BACKGROUND

The present disclosure relates generally to the field of bicycle seatposts and more particularly to automatic drop bicycle seatposts.

While mountain biking, it is often advantageous to lower the seatpost while climbing or descending. Current adjustable seatposts require a power source or for the user to place his or her weight on the seatpost in order to compress the adjustable seatpost to a lower height. Often it is inconvenient and time consuming to place one's weight on the adjustable seatpost before a climb or descent. Further, power sources are inconvenient to maintain.

Many adjustable posts require a user to hold down a button while adjusting a post. Holding down the button is often inconvenient and can be awkward during execution. Thus, improved systems and methods for lowering seatposts are needed.

SUMMARY

One illustrative embodiment is directed to an apparatus including an upper post, a main post, a control tube, a tension spring, and a hydraulic reset. The upper post can include a compression spring. The main post can be configured to telescopically mate with the upper post. The control tube can be rotably coupled to the main post. The tension spring can be configured to pull the upper post to the main post. The hydraulic reset can be configured to compress the compression spring. The upper post and the control tube can be configured to selectively lock the upper post to the control tube at at least two positions. In a first position of the control tube, the control tube can be configured to engage the compression spring. In a second position of the control tube, the control tube can be configured to disengage the compression spring.

One illustrative embodiment is directed to an apparatus including an air spring, a control tube, a tension spring, and a hydraulic reset. The air spring can include an upper air spring and a lower air spring. The control tube can be configured to rotate relative to the air spring. The tension spring can be configured to pull the upper air spring to the control tube. The hydraulic reset can be configured to compress the air spring. The upper air spring and the control tube can be configured to selectively lock the upper air spring to the control tube at at least two positions. In a first position of the control tube, the control tube can be configured to engage the lower air spring. In a second position of the control tube, the control tube can be configured to disengage the lower air spring.

Another illustrative embodiment is directed to an apparatus including a seat post including an upper post and a lower post. The seat post can further include a compression spring coupled to the upper post and the lower post. The seat post can further include a control tube configured to rotate relative to the upper post. The upper post and the control tube can be configured to selectively lock the upper post to the control tube at at least two positions.

Another illustrative embodiment is directed to an apparatus including a seat post including an upper post, a lower post, a first mechanical energy source, a second mechanical energy source, and a control mechanism. The first mechanical energy source can be configured to contract the lower post and the upper post. The second mechanical energy source can be configured to expand the lower post and the upper post. The control mechanism can be configured to activate the first mechanical energy source to contract the lower post and the upper post to a first predetermined position.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION OF THE ILLUSTRATIVE EMBODIMENTS

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

The present disclosure is directed to an automatic drop seatpost system and method. The automatic drop seatpost system can include an upper post, which can be attached to a saddle, and a main post, which can be attached to a seat tube. In one embodiment, two springs can be used; one to store the energy needed to push the post from bottom to top, and another to pull the post down to the middle position during an auto-drop sequence. An air-spring can be used as the primary spring which pushes the post up. When the strong air-spring pushes the post up, it can stretch a weaker coil spring as the post rises. When the post is in the up position, the weak coil spring can be fully stretched and ready to pull down during the auto-drop sequence. To allow the coil spring to pull the post down, the post can unlock from the up position, and the bottom can fall out from below the strong air spring. When this happens the weak coil spring can pull the post down to the middle, auto-drop position. Rider weight can further compress the post from middle to down position, and at the same time the post can be reloaded. The air-spring can be compressed to store energy to push the post back up when the rider is ready.

The automatic drop seatpost system can include two energy storage components, a recharging mechanism such as a hydraulic reset, and a control mechanism to control the two energy storage components. The two energy storage components can include an air spring and a pull-down spring. The control mechanism can interface with pawls and can include a button that lock and unlock the two energy storage components to control movement of the upper post and main post.

In an up position, the air spring can be expanded and the pull-down spring can be expanded. Thus, the air spring is in a low energy state and the pull-down spring is in a high energy state. The air spring can sit on the button in the control tube. The upper post can be locked in an up position by the pawls engaged in the control tube.

The control tube can be rotated to disengage the air spring from the button and to disengage the pawls causing the pull-down spring to contract, pulling down the air spring and the upper post to an autodrop position.

In the autodrop position, the air spring can be expanded and the pull-down spring can be contracted. Thus, the air spring is in a low energy state and the pull-down spring is in a low energy state. The upper post can be locked in an autodrop position by the pawls engaged in the control tube.

The control tube can be rotated to disengage the pawls. The user can place his or her weight on the upper post causing the hydraulic reset to compress the air spring and set the air spring above the button.

In the down position, the air spring can be compressed and the pull-down spring can be contracted. Thus, the air spring is in a high energy state and the pull-down spring is in a low energy state. The upper post can be locked in a down position by the pawls engaged in the control tube.

The control tube can be rotated to disengage the pawls. The air spring can expand, pushing the upper post into the up position. The upper post can be locked in the up position by the pawls engaged in the control tube.

Figure 1:
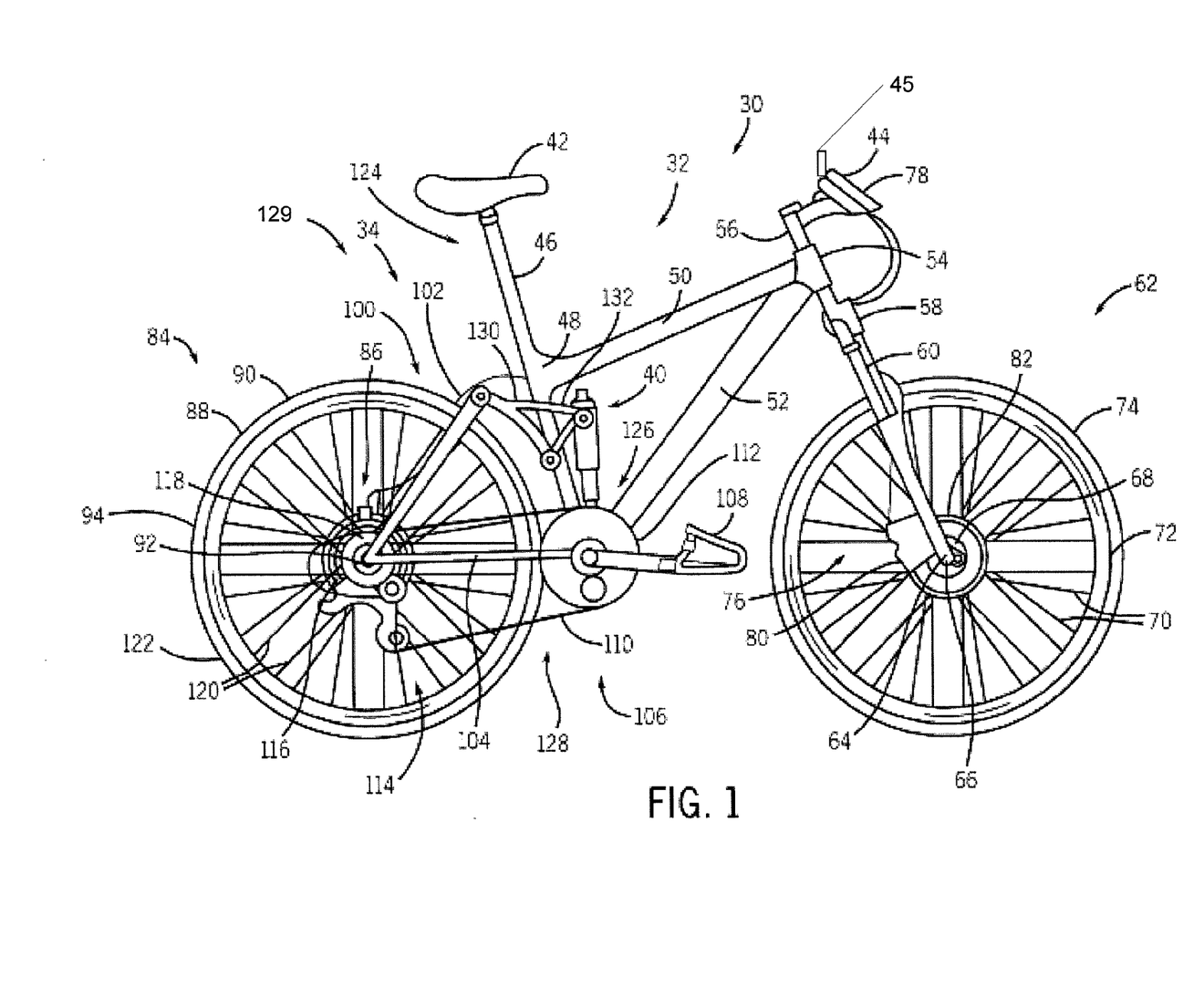
FIG. 1 is a diagram of a bicycle in accordance with an illustrative embodiment.

Referring to FIG. 1, a diagram of a bicycle 30 in accordance with an illustrative embodiment is shown. The bicycle 30 can include a frame assembly 32 equipped with a rear wheel suspension system 34 that can include a shock absorber, shock assembly, or shock 40. Bicycle 30 can include a seat 42 and handlebars 44 that are attached to frame assembly 32. A seat post 46 can be connected to seat 42 and slidably engage a seat tube 48 of frame assembly 32. The seat post 46 can be an automatic drop seat post as described further below. A top tube 50 and a down tube 52 can extend forwardly from seat tube 48 to a head tube 54 of frame assembly 32. Handlebars 44 can be connected to a stem 56 that passes through head tube 54 and engage a fork crown 58. A pair of forks 60 can extend from generally opposite ends of fork crown 58 and support a front wheel assembly 62 at an end of each fork or a fork tip 64. Fork tips 64 can engage generally opposite sides of an axle 66 that cooperates with a hub 68 of front wheel assembly 62. A number of spokes 70 can extend from hub 68 to a rim 72 of front wheel assembly 62. A tire 74 can extend about rim 72 such that rotation of tire 74, relative to forks 60, rotates rim 72 and hub 68. An autodrop actuator lever 45 can be attached to the handlebars 44. The autodrop actuator lever 45 can be coupled to the seat post 46, for example, by a cable.

In one embodiment, each fork 60 can be a shock absorber so as to allow translation of axle 66 of front wheel assembly 62 relative to frame assembly 32. Although each fork 60 is shown as having respective ends secured proximate one of frame assembly 32 and axle 66, shocks according to one or more of the illustrative embodiments can be equally applicable to bicycle front wheel suspension features.

Bicycle 30 can include a front brake assembly 76 having an actuator 78 attached to handlebars 44. Brake assembly 76 can include a caliper 80 that cooperates with a rotor 82 to provide a stopping or slowing force to front wheel assembly 62. A rear wheel assembly 84 of bicycle 30 can also include a disc brake assembly 86 having a rotor 88 and a caliper 90 that are positioned proximate a rear axle 92. A rear wheel 94 can be positioned generally concentrically about rear axle 92. One or both of front wheel assembly 62 and rear wheel assembly 84 can be equipped with other brake assemblies, such as brakes assemblies that include structures that engage the rim or tire of a respective wheel assembly.

A rear wheel suspension system 100 can be pivotably connected to frame assembly 32 and allows rear wheel 94 to move independent of seat 42 and handlebars 44. Suspension system 100 can include a seat stay 102 and a chain stay 104 that offset rear axle 92 from a crankset 106. Crankset 106 can include oppositely positioned pedals 108 that can be operationally connected to a chain 110 via a chain ring or sprocket 112. Rotation of chain 110 can communicate a drive force to a rear section 114 of bicycle 30. A gear cluster 116 can be positioned at rear section 114 and engage chain 110. The gear cluster 116 can be generally concentrically orientated with respect to rear axle 92 and can include a number of variable diameter gears. The gear cluster 116 can be operationally connected to a hub 118 of rear wheel 94 of rear wheel assembly 84. A number of spokes 120 can extend radially between hub 118 and a rim 122 of rear wheel assembly 84. Rider operation of pedals 108 can drive chain 110 thereby driving rear wheel 94 which in turn propels bicycle 30.

Frame assembly 32 can include a first frame member or forward frame portion 124 that generally can include seat tube 48, top tube 50, down tube 52, and head tube 54. A bottom bracket 126 can be formed proximate the interface of seat tube 48 and down tube 52 and can be constructed to operatively connect crankset 106 to bicycle frame assembly 32. A first end 128 of chain stay 104 can be pivotably connected to forward frame portion 124 proximate bottom bracket 126 to allow a second frame member or rear frame portion 129 to pivot or rotate relative to forward frame portion 124. The rear frame portion 129 generally can include chain stays 104, seat stays 102, and a pivot or rocker arm 130 that is attached to forward frame portion 124. The rocker arm 130 can be pivotably attached to seat tube 48 of forward frame portion 124.

The rocker arm 130 can include a forward arm 132 that extends inboard relative to seat tube 48. The shock 40 can be secured between forward arm 132 of rocker arm 130 and a position proximate bottom bracket 126. The shock 40 can be attached directly to forward frame portion 124. The chain stay 104 can be pivotably attached to seat tube 48 and extend forward of seat tube 48 proximate the bottom bracket 126. Such a construction can indirectly secure the shock 40 to the forward frame portion 124 and can allow both mounting points of the shock 40 to move or pivot during operation of suspension system 100. This orientation of suspension system 100 is more fully described in U.S. patent application Ser. No. 11/735,816, filed on Apr. 16, 2007, the disclosure of which is incorporated herein in its entirety.

The shock 40 can arrest, suppress, or dampen motion between the rear frame portion 129 and the forward frame portion 124. The frame assembly 32 is illustrative of one frame assembly usable with the present subject matter. Other frame assemblies, such as frame assemblies having other moveable frame structures or other shock orientations can be used. The shock 40 can be positioned in any number of positions relative to the forward frame portion 124. For instance, when located in a forward position, the shock 40 can provide a forward wheel suspension feature where one end of the shock is secured proximate a forward wheel axle and another end of the shock is secured nearer the frame assembly 32. In a rearward position, the shock 40 could be positioned rearward of seat tube 48, such as between a seat stay and seat tube 48. In other embodiments, rather than the generally vertical orientation shown in FIG. 1, the shock 40 can be generally aligned with top tube 50 and engaged with a U-shaped seat stay that can be movable relative to seat tube 48. Alternatively, the seat post 46 can be used with any type or configuration of bicycle, vehicle, or support structure.

Figure 2:
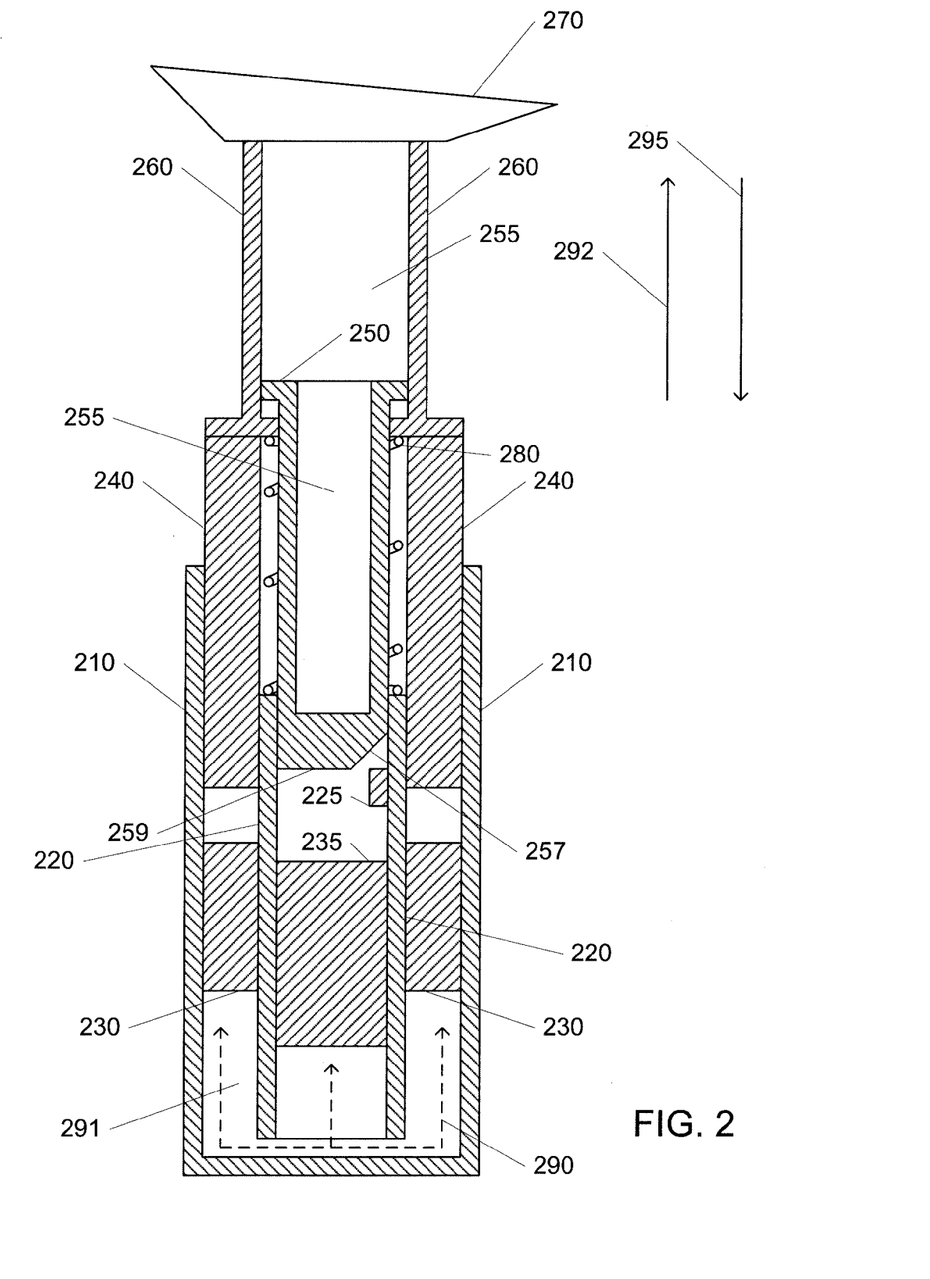
FIG. 2 is a block diagram of an automatic drop seatpost in accordance with an illustrative embodiment.

Referring to FIG. 2, a block diagram of a simplified automatic drop seatpost 200 in accordance with an illustrative embodiment is shown. FIG. 2 shows a conceptual diagram of the simplified automatic drop seatpost 200. The simplified automatic drop seatpost 200 can include a main post 210, a control tube 220, an outer piston 230, an inner piston 235, a carrier 240, a lower air spring 250, and an upper air spring 260, a saddle mount 270, and a spring 280.

The lower air spring 250 and the upper air spring 260 can form an air spring 255. The upper air spring 260 can be coupled to saddle mount 270. A saddle can be attached to the saddle mount 270. A bottom of the lower air spring 250 can include an engagement portion 259 and a disengagement portion 257. The lower air spring 250 and the upper air spring 260 can be configured so that the lower air spring 250 and the upper air spring 260 do not rotate relative to one another. For example, the lower air spring 250 can be keyed to the upper air spring 260 and vice versa. In one embodiment, an inside of the upper air spring 260 is hexagonal and an outside of the lower air spring 250 is hexagonal. Consequently, the lower air spring 250 cannot rotate in the upper air spring 260. Alternatively, the air spring 255 can be replaced with a mechanical spring.

The control tube 220 can be coupled to the main post 210. The control tube 220 can rotate relative to main post 210. The control tube 220 can include a button 225. The button 225 can be spring loaded so that the button 225 pushes into the interior of the control tube 220. In a first position of the control tube 220, the engagement portion 259 of the lower air spring 250 can rest on the button 225. In a second position of the control tube 220, the disengagement portion 257 of the lower air spring 250 can push the button 225 aside so that the lower air spring 250 can pass by the button 225. Alternatively, the lower air spring 250 can include grooves for a pin in the control tube 220 to travel in, or vice versa. Alternatively, the lower air spring 250 can be coupled to the control tube 220 with a coupling device such as a latch, a solenoid, a key, a detent, or any other locking device.

The outer piston 230 can be located between the main post 210 and the control tube 220. The inner piston 235 can be located in the control tube 220. The outer piston 230, main post 210, control tube 220, and inner piston 235 can form a hydraulic chamber 291. The hydraulic chamber 291 can be filled with a hydraulic fluid such as oil. The hydraulic fluid can travel between the main post 210 and the control tube 220 as indicated by arrow 290. Pushing on the outer piston 230 forces the inner piston 235 up in the control tube 220. Pushing on the inner piston 235 forces the outer piston 230 up between the main post 210 and the control tube 220. Alternatively, the outer piston 230 can be located remotely from the control tube 220. Alternatively, the inner piston 235 can be manipulated with a jack screw and motor instead of hydraulics. The motor can be controlled by a controller such as described in U.S. patent application Ser. No. 13/526,372.

The spring 280 can be a tension spring. The spring 280 can couple the control tube 220 to the upper air spring 260. For example, a top of the control tube 220 can include a groove for retaining a first end of spring 280 and the bottom of the upper air spring 260 can include a groove for retaining a second end of spring 280. Thus, the spring 280 can pull the upper air spring 260 towards and into the control tube 220. The air spring 255 can hold more energy than the spring 280. Thus, the air spring 255 can overpower and expand the spring 280. The air spring 255 can be pressurized to a predetermined pressure to adjust the energy storage of the air spring 255 versus the spring 280. In one embodiment the air spring 255 can be pressurized in a range of 100 psi to 250 psi.

The carrier 240 can lock and unlock with the control tube 220 to support and release the upper air spring 260 and saddle mount 270. The carrier 240 can be located and between the upper air spring 260 and the outer piston 230. The carrier 240 can be coupled to the upper air spring 260. In one embodiment, the carrier 240 can be keyed to the main post 210 to prevent the carrier 240 from rotating. In one embodiment, carrier 240 can be a cylinder located around the control tube 220.

In an up position, the air spring 255 can be expanded and the spring 280 can be expanded. In FIG. 2, up is in the direction of arrow 292 and down is in the direction of arrow 295. Thus, the air spring 255 is in a low energy state and the spring 280 is in a high energy state. The lower air spring 250 can sit on the button 255 in the control tube 220. The carrier 240 can be locked to the control tube 220 in an up position. Hence the carrier 240 can support the upper air spring 260.

The control tube 220 can be rotated to disengage the engagement portion 259 from the button 225 and to unlock the carrier 240 from the control tube 220. In one embodiment, the disengagement portion 257 can push the button 225 in, allowing the air spring 255 to pass by the button 225. The spring 280 can contract, pulling down the upper air spring 260 and the saddle mount 270 to an autodrop position.

In an autodrop position, the air spring 255 can be expanded and the spring 280 can be contracted. Thus, the air spring 255 is in a low energy state and the spring 280 is in a low energy state. In one embodiment, the carrier 240 can be locked to the control tube 220 in an autodrop position. The autodrop position can be a predetermined position.

The control tube 220 can be rotated to unlock the carrier 240 from the control tube 220. The user can place his or her weight on a saddle attached to the saddle mount 270, causing upper air spring 260 to press against the carrier 240, causing the carrier 240 to press on the outer piston 230. The downward motion of the outer piston 230 causes the inner piston 235 to push up via hydraulics. The inner piston 235 can press on the lower air spring 250, pressing the lower air spring 250 into the upper air spring 260 (which is being pressed down by the user's weight), thereby recharging the air spring 255. The inner piston 235 can press the lower air spring 250 past the button 225 of the control tube 220. The engagement portion 259 of the lower air spring 250 can rest on the button 225 after the engagement portion 259 clears the button 225.

In the down position, the air spring 255 can be compressed and the spring 280 can be contracted. Thus, the air spring 255 is in a high energy state and the spring 280 is in a low energy state. The carrier 240 be locked to the control tube 220 in a down position.

The control tube 220 can be unlocked from the carrier 240. The air spring 255 can expand, pushing the upper air spring 260 into the up position. The carrier 240 be locked to the control tube 220 in the up position. Alternatively, the control tube 220 and the carrier 240 can include a plurality of lock up positions.

Advantageously, the simplified automatic drop seatpost 200 can be dropped to a lower position without placing one's weight on the adjustable seatpost before a climb or descent. Advantageously, the simplified automatic drop seatpost 200 does not require an external power source.

Figure 3:
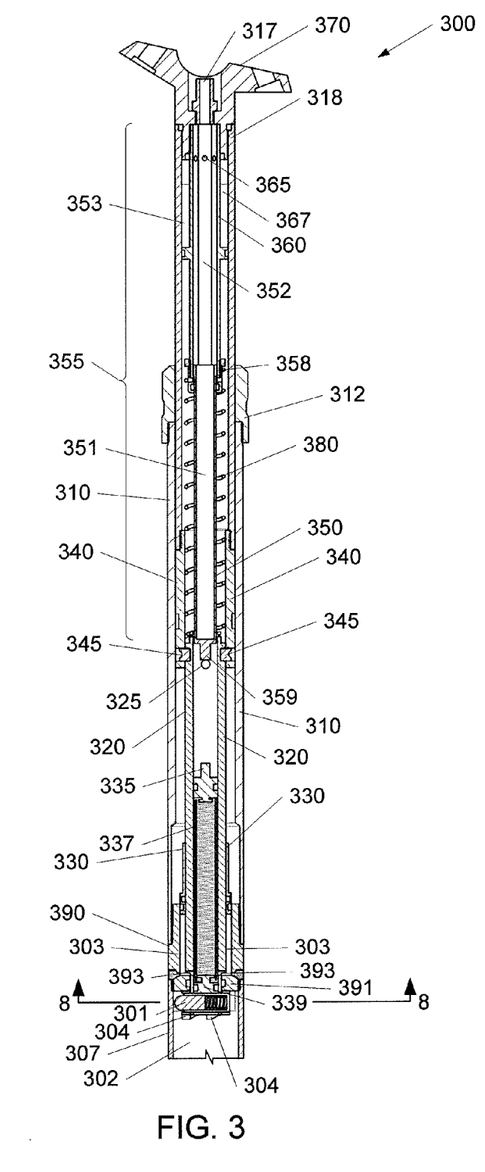
FIG. 3 is a front view of an automatic drop seatpost in an up position in accordance with an illustrative embodiment.

Referring to FIG. 3, a front view of an automatic drop seatpost 300 in an up position in accordance with an illustrative embodiment is shown. The automatic drop seatpost 300 can include The automatic drop seatpost 300 can include a main post 310, an upper post 318, a control tube 320, an outer piston 330, an inner piston 335, a pawl carrier 340, a lower air spring 350, and an upper air spring 360, a saddle mount 370, and an autodrop spring 380.

The main post 310 can be configured to insert into the seat post of a bicycle. The main post 310 can have a diameter of about 22 mm to about 35 mm; however, any diameter is possible. In one embodiment, the main post 310 can have a diameter of about 27.2 mm. The main post 310 and the upper post 318, together, can have a length of about 75 mm to about 430 mm. The upper post 318 can telescopically insert into the main post 310. A dust seal 312 can be located at a top of the main post 310 to seal and support the upper post 318.

The lower air spring 350 and the upper air spring 360 can form an air spring 355. The air spring 355 can include a lower chamber 351, an upper chamber 352, and an auxiliary chamber 353. The lower chamber 351, the upper chamber 352, and the auxiliary chamber 353 can be fluidly coupled.

The upper air spring 360 can be coupled to saddle mount 370. A saddle can be attached to the saddle mount 370. The upper air spring 360 can include a fill valve 317. The fill valve 317 can be located in saddle mount 370. In one embodiment, the fill valve 317 can be accessed through the top of the saddle mount 370. In another embodiment, the fill valve 317 can be accessed through the side of the saddle mount 370. In one embodiment, the upper air spring 360 can be a cylinder with a hexagonal interior. In one embodiment, the upper air spring 360 can include upper air spring ports 365. The upper air spring ports 365 can fluidly couple the upper chamber 352 to the auxiliary chamber 353. The auxiliary chamber 353 can be defined by a portion of the upper post 318, a portion of the upper air spring 360, and a portion of saddle mount 370. The auxiliary chamber 353 can increase the total volume of the air spring 355. The upper post 318 can be coupled to the saddle mount 370 so that the upper post 318 and upper air spring 360 move together.

The lower air spring 350 can be sealed to the upper air spring 360. A bottom of the lower air spring 350 can include an engagement portion 359 and a disengagement portion (not shown). The lower air spring 350 can be a cylinder. The lower air spring 350 and the upper air spring 360 can be configured so that the lower air spring 350 and the upper air spring 360 do not rotate relative to one another. For example, the lower air spring 350 can be keyed to the upper air spring 360 and vice versa. In one embodiment, an inside of the upper air spring 360 is hexagonal and the lower air spring 350 can include a hexagonal top 358 configured to mate with the hexagonal interior of the inside of the upper air spring 360. Consequently, the lower air spring 350 cannot rotate in the upper air spring 360.

Figure 4:
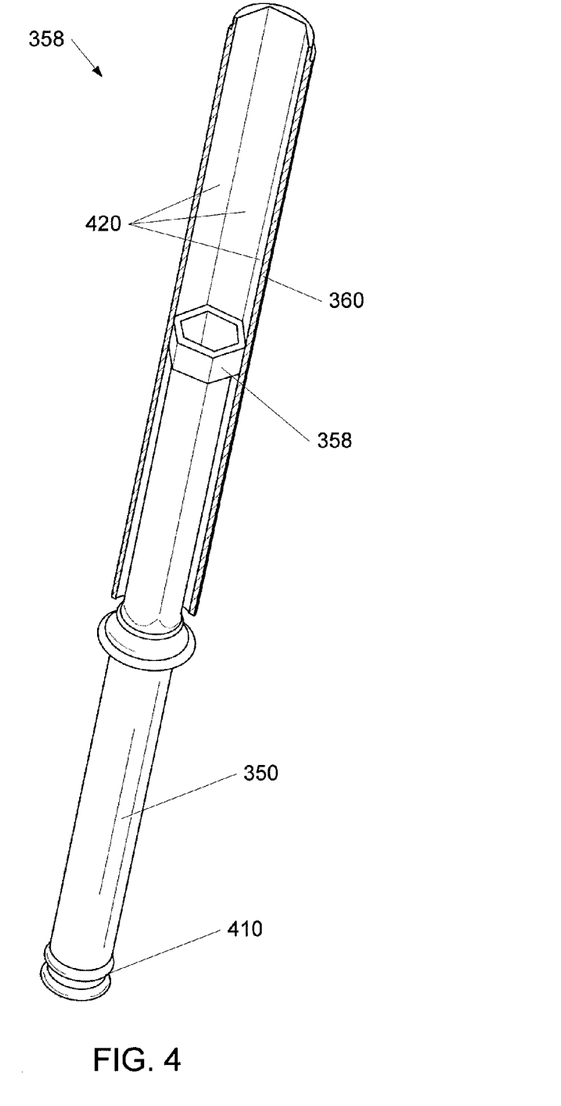
FIG. 4 is a perspective, partial section view of the air spring of the automatic drop seatpost of FIG. 3 in accordance with an illustrative embodiment.

Referring now to FIG. 4, a perspective, partial section view of the air spring 355 of the automatic drop seatpost of FIG. 3 in accordance with an illustrative embodiment is shown. In FIG. 4, the upper air spring 360 is sectioned lengthwise to show the interior of the upper air spring 360. Note that the auxiliary chamber 353 of the air spring 355 is not shown.

The air spring 355 can include the lower air spring 350 and the upper air spring 360. The lower air spring 350 can include a guide 410, for guiding the lower air spring 350 in the control tube 320 (not shown). The upper air spring 360 can include a hexagonal interior 420. The lower air spring 350 can be sealed to the hexagonal interior 420 of the upper air spring 360 by the hexagonal top 358 of the lower air spring 350.

Referring again to FIG. 3, the control tube 320 can be coupled to a bottom of the main post 310. The control tube 320 can rotate relative to main post 310. The control tube 320 can include a button 355. The button 355 can be spring loaded so that the button 355 pushes into the interior of the control tube 320. In a first position of the control tube 320, the engagement portion 259 of the lower air spring 350 can rest on the button 355. In a second position of the control tube 320, the disengagement portion (not shown) of the lower air spring 350 can push the button 355 aside so that the lower air spring 350 can pass by the button 355. In one embodiment, the control tube 320 can include a single button. In another embodiment, the control tube 320 can include a two opposing buttons. In other embodiments, the control tube 320 can include a plurality of buttons.

Figures 5, 6:
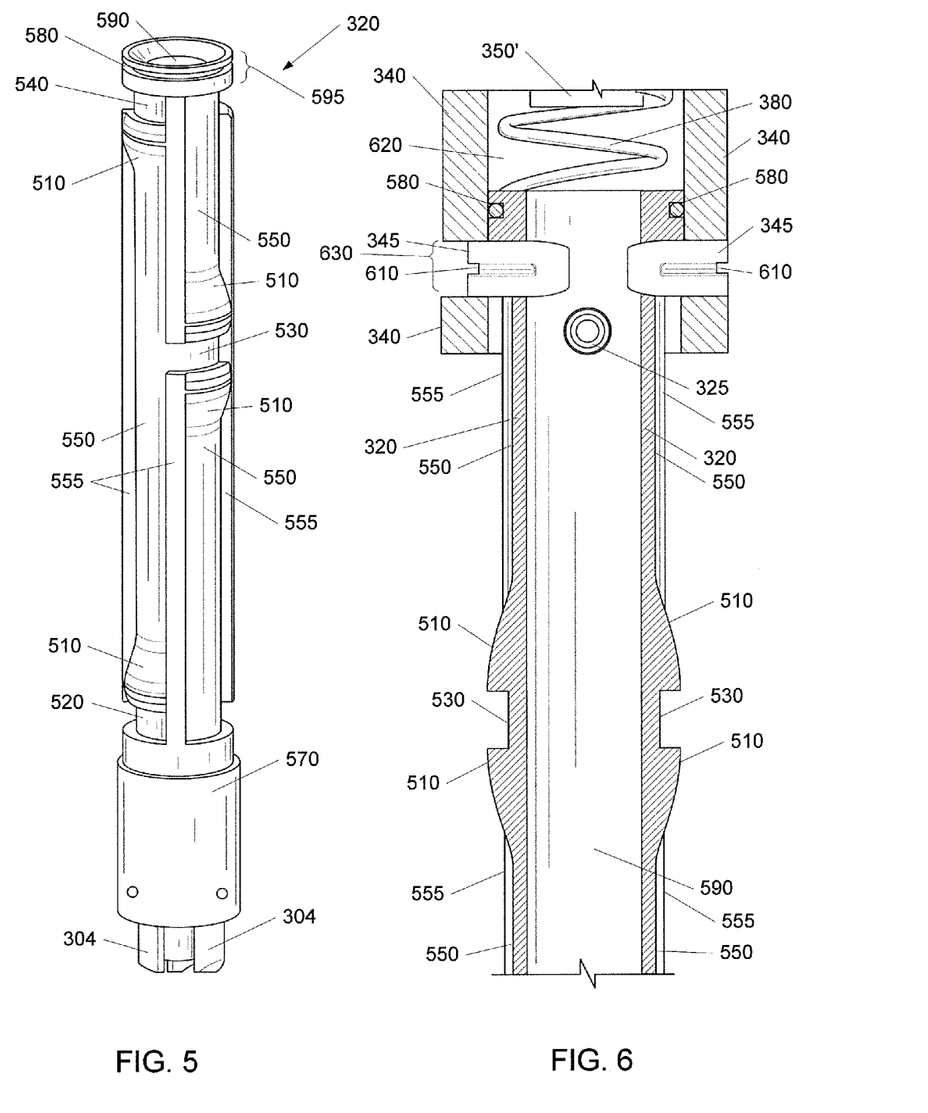
FIG. 5 is a perspective view of the control tube of the automatic drop seatpost of FIG. 3 in accordance with an illustrative embodiment.
FIG. 6 is a front section view of the control tube and the pawl carrier of the automatic drop seatpost of FIG. 3 in accordance with an illustrative embodiment.

Referring now to FIG. 5, a perspective view of the control tube 320 of the automatic drop seatpost of FIG. 3 in accordance with an illustrative embodiment is shown. The control tube 320 can be a cylinder made of a metal, such as aluminum, or plastic. The control tube 320 can include ramps 510, a bottom pawl locking slot 520, an autodrop pawl locking slot 530, a top pawl locking slot 540, channels 550, shifter teeth ring 304, a piston surface 570, an autodrop spring groove 580, a bore 590, and a control tube guide 595.

The channels 550 can extend length-wise, up and down the control tube 320. The channels 550 can be separated by rails 555. The channels 550 can be configured to contain and guide one or more pawls 345 (not shown).

The pawls can be guided up and down along channels 550 to ramps 510. The pawls can ride up the ramps 510 and fall into, for example, one of the bottom pawl locking slot 520, the autodrop pawl locking slot 530, or the top pawl locking slot 540. When the automatic drop seatpost is in an up position, the pawls can be locked into the top pawl locking slot 540. When the automatic drop seatpost is in an autodrop position, the pawls can be locked into the autodrop pawl locking slot 530. The autodrop pawl locking slot 530 can be located about midway between the top pawl locking slot 540 and the bottom pawl locking slot 520; however, any location is possible. The slots can be open-ended so that when the control tube 320 rotates, the pawls 345 can be positioned in channels 550, and are able to move up or down in the channels 550. Alternatively, the control tube 320 can include any number of locking slots and channels. A plurality of locking slots and channels can correspond to various drop and push up stages and/or various drop and push up sequences.

The piston surface 570 can be configured to maintain a hydraulic seal with the outer piston 330 (not shown). An inner bore of the outer piston 330 can ride on the piston surface 570. In one embodiment, the piston surface 570 can be a wear-resistant material or a sleeve. The control tube 320 can include hydraulic ports (not shown) that fluidly connect the outside of the piston surface 570 to the bore 590. The bore 590 can be configured to maintain a hydraulic seal with the inner piston 335 (not shown).

The shifter teeth ring 304 can be located at the bottom of the control tube 320. The shifter teeth ring 304 can be a separate piece that is pinned to the control tube 320. The shifter teeth ring 304 can be manipulated by a shifter (not shown) to rotate the control tube 320. As the control tube 320 by the shifter, the pawls 345 can lock into the slots after being sprung or pressed up and down the channels 550.

Referring again to FIG. 3, the pawl carrier 340 can lock and unlock with the control tube 320 to support and release the upper air spring 360, the upper post 318, and the saddle mount 370. In one embodiment, the pawl carrier 340 can be coupled to the upper post 318. In one embodiment, the pawl carrier 340 can be part of the upper post 318. The pawl carrier 340 can be located above the outer piston 330. In one embodiment, the pawl carrier 340 and/or the upper post 318 can be keyed to the main post 310 to prevent the pawl carrier 340 from rotating.

The autodrop spring 380 can be a tension spring. The autodrop spring 380 can couple the control tube 320 to the upper air spring 360. For example, a top of the control tube 320 can include a groove (element 580) for retaining a first end of autodrop spring 380 and the bottom of the upper air spring 360 can include a groove for retaining a second end of autodrop spring 380. Thus, the autodrop spring 380 can pull the upper air spring 360, the upper post 318, and the pawl carrier 340 towards the control tube 320. The air spring 355 can hold more energy than the autodrop spring 380. Thus, the air spring 355 can overpower and expand the autodrop spring 380. The air spring 355 can be pressurized to a predetermined pressure to adjust the energy storage of the air spring 355 versus the autodrop spring 380. In one embodiment, the air spring 355 can be pressurized in a range of 100 psi to 250 psi.

Referring now to FIG. 6, a front section view of the control tube 320 and the pawl carrier 340 of the automatic drop seatpost 300 of FIG. 3 in accordance with an illustrative embodiment is shown. The pawl carrier 340 is depicted in the up position on the control tube 320. The lower air spring 350 is simplified and truncated for the purposes of clarity and explanation. (In an up position, the lower air spring 350 sits on the button 325)

As discussed above, the control tube 320 can include ramps 510, the autodrop pawl locking slot 530, rails 555, the autodrop spring groove 580, the bore 590, the button 325, and the control tube guide 595. In one embodiment, the autodrop spring 380 can be coupled to the control tube 320 by the autodrop spring groove 580. An end of the autodrop spring 380 can sit in the autodrop spring groove 580.

The pawl carrier 340 can include a carrier bore 620 and pawl slots 630. The control tube guide 595 can be configured to fit in the carrier bore 620. Pawls 345 can sit in the pawl slots 630. The pawls 345 can slide between an engaged position, as shown on the left, and a disengaged position, as shown on the right. The pawls 345 can be biased inward by a ring spring (not shown) that can sit in pawl spring grooves 610, that are located on the back, or outside face, of the pawls 345. As the pawl carrier 340 travels up and down the control tube 320, the pawls 345 can ride against the channels 550 and the ramps 510, and engage in slots such as the autodrop pawl locking slot 530.

Figure 7:
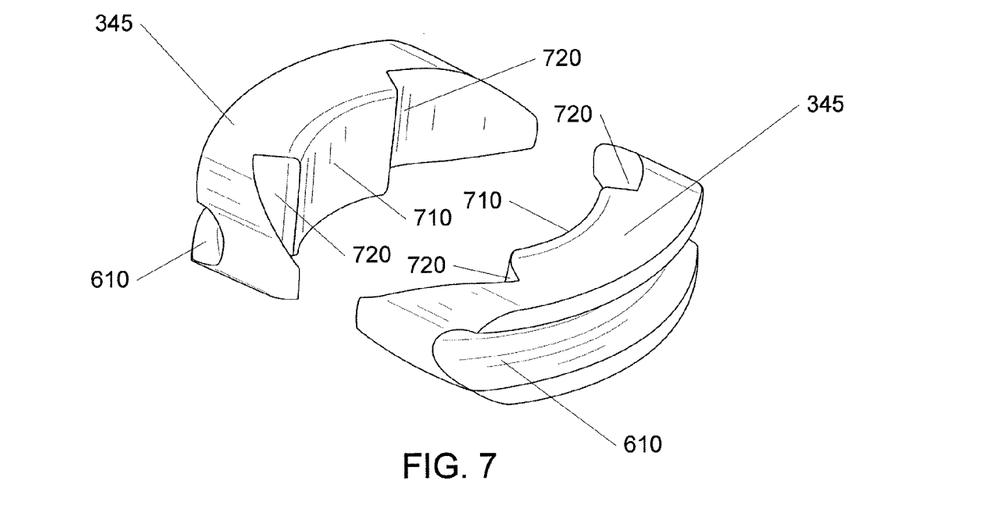
FIG. 7 is a perspective view of the pawls of the automatic drop seatpost of FIG. 3 in accordance with an illustrative embodiment.

Referring now to FIG. 7, a perspective view of the pawls 345 of the automatic drop seatpost of FIG. 3 in accordance with an illustrative embodiment is shown. The pawls 345 can ride in the pawl carrier 340 (not shown) as discussed above. In one embodiment, the pawls 345 can each be shaped like e-clips or a crescent; however, any shape is possible. Each pawl 345 can include the pawl spring groove 610. A ring spring (not shown) that can sit in pawl spring grooves 610 and push a set of pawls 345 together to lock the pawl carrier 340 to the control tube 320 (not shown).

Each pawl 345 can include a channel follower 710 and rail ledges 720. The channel follower 710 can be configured to ride in the channels 550 (not shown) and fit in the slots 420, 430, and 440 (not shown). The channel follower 710 can ride between the rails 455 (not shown). The rail ledges 720 can ride on top of the rails 455.

Referring again to FIG. 3, the outer piston 330 can be located between the main post 310 and the control tube 320. The inner piston 335 can be located in the control tube 320. The outer piston 330, an outer hydraulic chamber 390, a hydraulic chamber bottom 391, the control tube 320, a return spring retainer 339, and the inner piston 335 can form a hydraulic chamber 303. The hydraulic chamber bottom 391 can be coupled to the outer hydraulic chamber 390. The outer hydraulic chamber 390 can be coupled to the main post 310. The control tube 320 can be sealed to the hydraulic chamber bottom 391.

The control tube 320 can include the return spring retainer 339. The return spring retainer 339 can be sealed to the control tube 320. The return spring retainer 339 can be coupled to one end of a return spring 337. The inner piston 335 can be coupled to another end of the return spring 337. The return spring 337 can be a tension spring. When the inner piston 335 is pushed up, the return spring 337 can pull inner piston 335 down when hydraulic pressure is released.

The hydraulic chamber 303 can be filled with a hydraulic fluid such as oil. The hydraulic fluid can travel between the outside of the control tube 320 and the inside of the control tube 320 via hydraulic ports 393. Pushing on the outer piston 330 forces the inner piston 335 up in the control tube 320. Pushing on the inner piston 335 forces the outer piston 330 up between the outer hydraulic chamber 390 and the control tube 320. Alternatively, the outer piston 330 can be located remotely from the control tube 320.

The control tube 320 can include a detent 301. The detent 301 can include the shifter teeth ring 304. A shifter housing 307 can be coupled to the hydraulic chamber bottom 391. The shifter housing 307 can include a shifter void 302 for a shifter (not shown). The shifter can engage and manipulate the shifter teeth ring 304. In one embodiment, the shifter can be connected to a momentary lever on a handlebar of a bicycle via a cable. Pressing the lever can cause the shifter to advance the shifter teeth ring 304, and consequently the control tube 320, one position. The detent 301 can hold the control tube 320 in defined positions.

Figure 8:
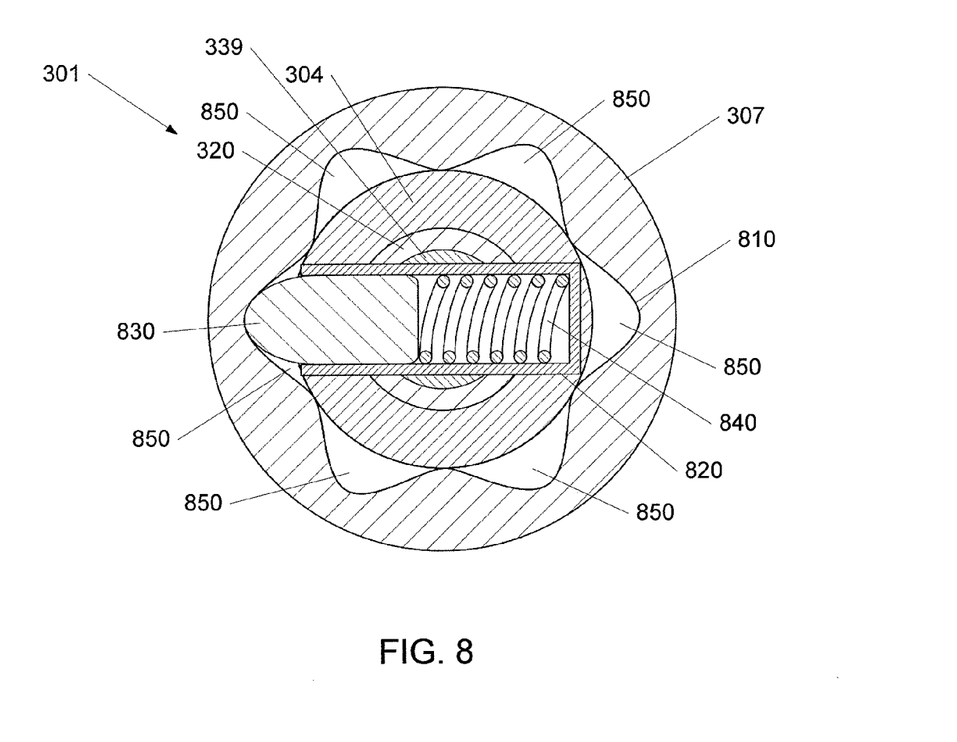
FIG. 8 is a bottom section view of the automatic drop seatpost of FIG. 3 in accordance with an illustrative embodiment.

Referring now to FIG. 8, a section view of the detent 301 of the automatic drop seatpost of FIG. 3 in accordance with an illustrative embodiment is shown. The detent 301 can include a detent groove 810 in the shifter void 302, a detent housing 820, a detent pin 830, and a detent spring 840. The detent housing 820 can be located through the shifter teeth ring 304, the control tube 320, and the return spring retainer 339. The detent housing 820 can function as a pin to hold and align the shifter teeth ring 304, the control tube 320, and the return spring retainer 339.

The detent pin 830 and detent spring 840 can be located in the detent housing 820. The detent spring 840 can push the detent pin 830 against the detent groove 810. The detent groove 810 can include holding positions 850. In one embodiment, the detent groove 810 can include six holding positions 850 corresponding to three pawl carrier 340 on the control tube 320. In other embodiments, more or fewer holding positions can be included. The detent 301 can prevent the control tube 320 from wandering between holding positions 850. As the shifter turns the shifter teeth ring 304, the control tube 320, the return spring retainer 339, and the detent housing 820 can rotate to the next holding position 850.

Referring again to FIG. 3, in an up position, the air spring 355 can be expanded and the autodrop spring 380 can be expanded. Thus, the air spring 355 is in a low energy state and the autodrop spring 380 is in a high energy state. The lower air spring 350 can sit on the button 355 in the control tube 320. The pawl carrier 340 can be locked to the top pawl locking slot 540 of the control tube 320 in an up position. Hence, the pawl carrier 340 can support the upper post 318, the upper air spring 360, and the saddle mount 370. The top position can be about 6 to 7 inches above the bottom position; however, any amount of drop is possible.

Figure 9:
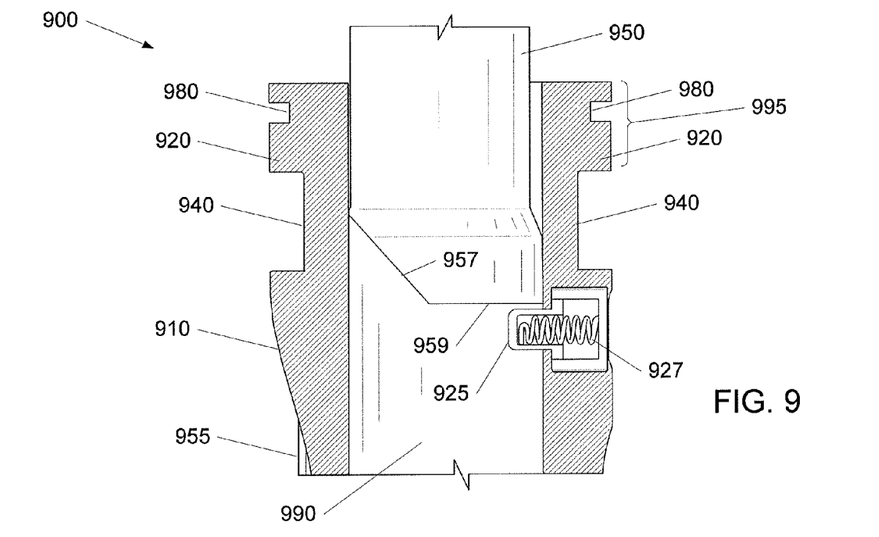
FIG. 9 is a front section view of an air spring and a control tube in a locked position in accordance with an illustrative embodiment.

Referring now to FIG. 9, a front section view of an air spring and a control tube in a locked position 900 in accordance with an illustrative embodiment is shown. FIG. 9 shows a simplified one button control tube and lower air spring. The air spring and the control tube in a locked position 900 can include a lower air spring 950 and a control tube 920.

The control tube 920 can include ramps 910, a top pawl locking slot 940, an autodrop spring groove 980, a bore 990, a button 925 and a control tube guide 995. The button 925 can be biased into the bore 990 by button spring 927.

The lower air spring 950 can include an engagement portion 959 and a disengagement portion 957. In a locked position, the engagement portion 959 of the lower air spring 950 can sit on and be supported by the button 925.

Referring again to FIG. 3, the control tube 320 can be rotated to disengage the engagement portion 259 from the button 355 and to unlock the pawl carrier 340 from the top pawl locking slot 540 of the control tube 320. The pawls 345 can move into the channels 550. In one embodiment, the disengagement portion (not shown) can push the button 355 in, allowing the air spring 355 to pass by the button 355. The autodrop spring 380 can contract, pulling down the upper air spring 360, the saddle mount 370, and the upper post 318 to an autodrop position. The autodrop position can be about halfway between the top and bottom positions; however, any amount of autodrop is possible.

Figure 10:
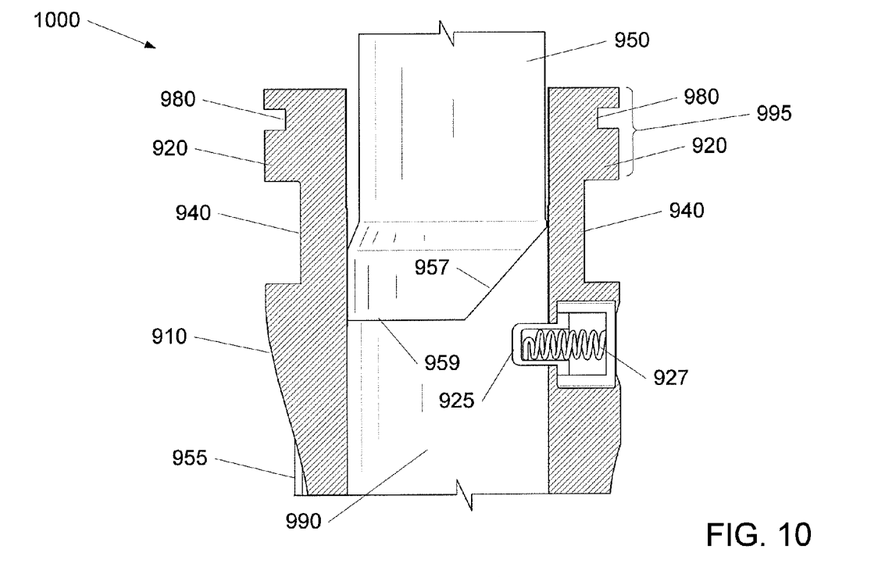
FIG. 10 is a front section view of an air spring and a control tube in an unlocked position in accordance with an illustrative embodiment.

Referring now to FIG. 10, a front section view of an air spring and a control tube of FIG. 9 in an unlocked position 1000 in accordance with an illustrative embodiment is shown. FIG. 10 shows a simplified one button control tube and lower air spring. The air spring and the control tube in an unlocked locked position 1000 can include the lower air spring 950 and the control tube 920 as described above.

In an unlocked position, the disengagement portion 957 of the lower air spring 950 can be aligned with the button 925. The disengagement portion 957 can have an angled face. As the lower air spring 950 is pulled down, the disengagement portion 957 can push the button 925 aside so that the bore 990 is unobstructed. Consequently, the lower air spring 950 (and the rest of the air spring) can be pulled into the bore 990.

Figure 11:
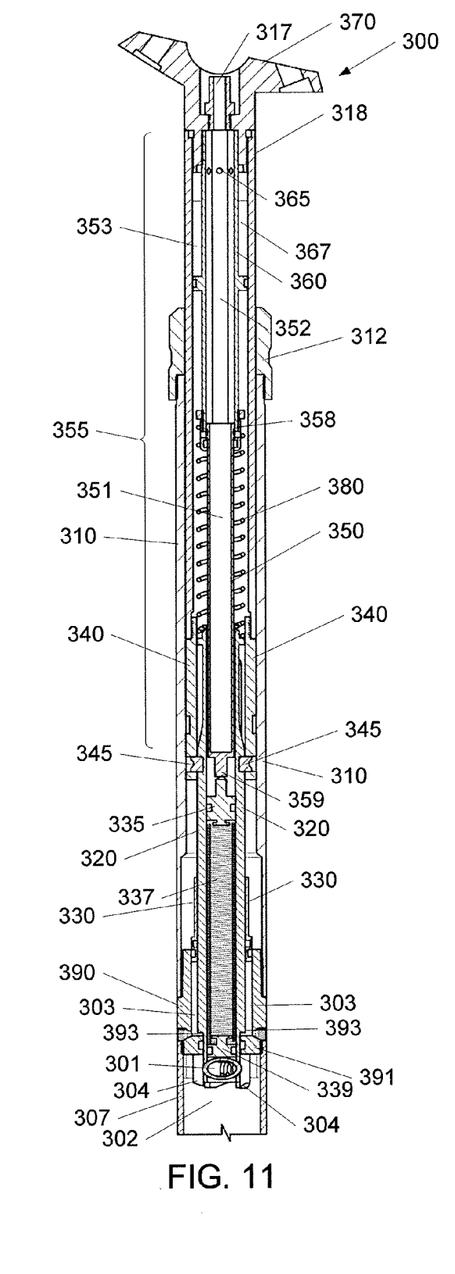
FIG. 11 is a front view of an automatic drop seatpost of FIG. 3 in an autodrop position in accordance with an illustrative embodiment.

Referring to FIG. 11, a front view of an automatic drop seatpost 300 of FIG. 3 in an autodrop position in accordance with an illustrative embodiment is shown. In the autodrop position, the air spring 355 can be expanded and the autodrop spring 380 can be contracted. Thus, the air spring 355 is in a low energy state and the autodrop spring 380 is in a low energy state. In one embodiment, the pawl carrier 340 can be locked to the autodrop pawl locking slot 530 of the control tube 320 in an autodrop position.

The control tube 320 can be rotated to unlock the pawl carrier 340 from the autodrop pawl locking slot 530 of the control tube 320. The pawls 345 can move into the channels 550. When the control tube 320 rotates the engagement portion 359 can be realigned with the button 355. The user can place his or her weight on a saddle attached to the saddle mount 370, causing upper air spring 360 to press against the pawl carrier 340, causing the pawl carrier 340 to press on the outer piston 330. The downward motion of the outer piston 330 causes the inner piston 335 to push up via hydraulics. The inner piston 335 can press on the lower air spring 350, pressing the lower air spring 350 into the upper air spring 360 (which is being pressed down by the user's weight), thereby recharging the air spring 355. The inner piston 335 can press the lower air spring 350 past the button 355 of the control tube 320. The engagement portion 259 of the lower air spring 350 can rest on the button 355 after the engagement portion 259 clears the button 355.

Figure 12:
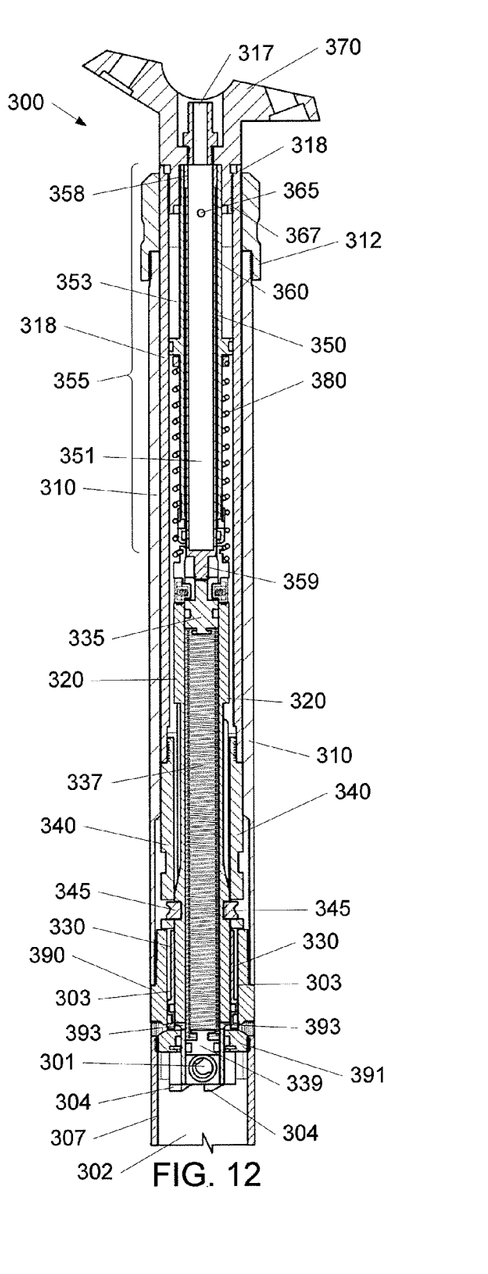
FIG. 12 is a front view of an automatic drop seatpost of FIG. 3 in a down position in accordance with an illustrative embodiment.

FIG. 12 is a front view of an automatic drop seatpost 300 of FIG. 3 in a down position in accordance with an illustrative embodiment. In the down position, the air spring 355 can be compressed and the autodrop spring 380 can be contracted. Thus, the air spring 355 is in a high energy state and the autodrop spring 380 is in a low energy state. The pawl carrier 340 can be locked to the bottom pawl locking slot 520 of the control tube 320 in a down position.

The control tube 320 can be unlocked from the bottom pawl locking slot 520 of the pawl carrier 340. The air spring 355 can expand, pushing the upper air spring 360 into the up position. The pawl carrier 340 can be locked to the top pawl locking slot 540 of the control tube 320 in the up position.

Advantageously, the automatic drop seatpost 300 can be dropped to a lower position without placing one's weight on the adjustable seatpost before a climb or descent. Advantageously, the automatic drop seatpost 300 does not require an external power source.

Figure 13:
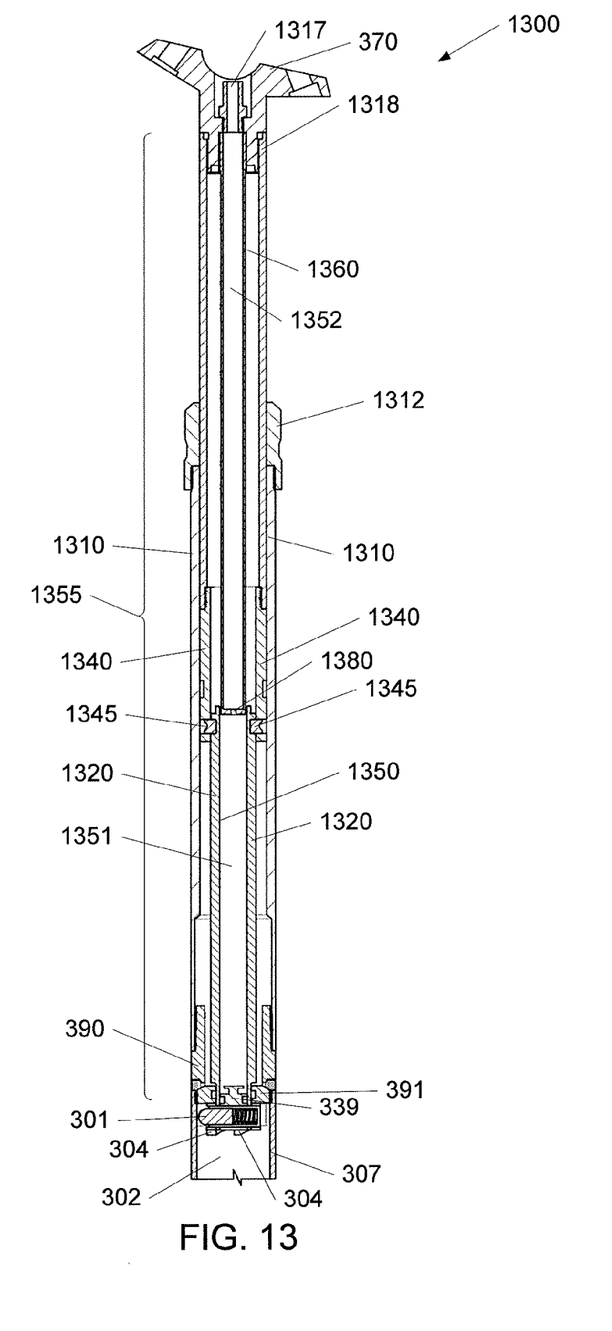
FIG. 13 is a front view of a drop seatpost in accordance with an illustrative embodiment.

Referring to FIG. 13, a front view of a drop seatpost 1300 in accordance with an illustrative embodiment is shown. The drop seatpost 1300 has most of the auto-drop componentry removed and replaced with a spring, such as an air spring. The drop seatpost 1300 can use the rotating control tube, as described above, to lock the saddle into different positions through the translation range of the seat post. By removing the auto-drop features and replacing with a spring, the drop seatpost 1300 will always push upward regardless of the position. A user can use his or her body weight on the saddle to push the post downward to lock the saddle into the different positions. The drop seatpost 1300 can include a main post 1310, an upper post 1318, a control tube 1320, a pawl carrier 1340, an upper air spring 1360, and a saddle mount 1370.

The main post 1310 can be configured to insert into the seat post of a bicycle. The main post 1310 can have a diameter of about 22 mm to about 35 mm; however, any diameter is possible. In one embodiment, the main post 1310 can have a diameter of about 27.2 mm. The main post 1310 and the upper post 1318, together, can have a length of about 75 mm to about 430 mm. The upper post 1318 can telescopically insert into the main post 1310. A dust seal 1312 can be located at a top of the main post 1310 to seal and support the upper post 1318.

The upper air spring 1360 and an inside bore 1350 of the control tube 1320 can form an air spring 1355. The air spring 1355 can include a lower chamber 1351 and an upper chamber 1352. The lower chamber 1351 and the upper chamber 1352 can be fluidly coupled. The air spring 1355 can also include auxiliary chambers. Alternatively, the air spring 1355 can be a mechanical spring.

The upper air spring 1360 can be coupled to saddle mount 1370. A saddle can be attached to the saddle mount 1370. The upper air spring 1360 can include a fill valve 1317. The fill valve 1317 can be located in saddle mount 1370. In one embodiment, the fill valve 1317 can be accessed through the top of the saddle mount 1370. In another embodiment, the fill valve 1317 can be accessed through the side of the saddle mount 1370. In one embodiment, the upper air spring 1360 can be a cylinder. The upper post 1318 can be coupled to the saddle mount 1370 so that the upper post 1318 and the upper air spring 1360 move together. The upper air spring 1360 can be sealed to the inside bore 1350 of the control tube 1320. The upper air spring 1360 can include a restriction 1380. The restriction 1380 can meter the air flow from the lower chamber 1351 to the upper chamber 1352 so that the air spring 1355 does not decompress suddenly.

The control tube 1320 can be coupled to a bottom of the main post 1310. The control tube 1320 can rotate relative to main post 1310. The control tube 1320 can be configured as in FIG. 5, but without hydraulic ports. The control tube 1320 can include ramps, slots, rails, and channels as discussed above. In some embodiments, the channels and slots of the control tube 1320 can be configured to force a particular sequencing. For example, in one embodiment, the only route for a pawl to travel can be from a top slot to a drop slot to a bottom slot to the top slot. In another embodiment, the route for a pawl to travel can be from a top slot to a drop slot to either the bottom slot or the top slot.

The pawl carrier 1340 can lock and unlock with the control tube 1320 to support and release the upper air spring 1360, the upper post 1318, and the saddle mount 1370. In one embodiment, the pawl carrier 1340 can be coupled to the upper post 1318. In another embodiment, the pawl carrier 1340 can be part of the upper post 1318. The pawl carrier 1340 can be located around the control tube 1320. In one embodiment, the pawl carrier 1340 and/or the upper post 1318 can be keyed to the main post 1310 to prevent the pawl carrier 1340 from rotating.

The control tube 1320 can include a detent 1301. The detent 1301 can include shifter teeth ring 1304. A shifter housing 1307 can be coupled to the hydraulic chamber bottom 1391. The shifter housing 1307 can include a shifter void 1302 for a shifter (not shown). The shifter can engage and manipulate the shifter teeth ring 1304. In one embodiment, the shifter can be connected to a momentary lever on a handlebar of a bicycle via a cable. Pressing the lever can cause the shifter to advance the shifter teeth ring 1304, and consequently the control tube 1320, one position. The detent 1301 can hold the control tube 1320 in defined positions.

In an up position, the air spring 1355 can be expanded. Thus, the air spring 1355 is in a low energy state. The pawl carrier 1340 can be locked to a top pawl locking slot of the control tube 1320 in an up position. Hence, the pawl carrier 1340 can support the upper post 1318, the upper air spring 1360, and the saddle mount 1370. The top position can be about 6 to 7 inches above the bottom position; however, any amount of drop is possible.

The control tube 1320 can be rotated to unlock the pawl carrier 1340 from the top pawl locking slot of the control tube 1320. The pawls can move into the channels. The air spring 1360 can hold the saddle at the top position until the user places his weight on the saddle. At his convenience, the user can place his weight on the saddle, pushing down the upper air spring 1360, the saddle mount 1370, and the upper post 1318 to a drop position. The drop position can be about halfway between the top and bottom positions; however, any amount of drop is possible. In the drop position, the air spring 1355 can be partially compressed. In one embodiment, the pawl carrier 1340 can be locked to a drop pawl locking slot of the control tube 1320 in the drop position.

The control tube 1320 can be rotated to unlock the pawl carrier 1340 from the drop pawl locking slot of the control tube 1320. The pawls can move into the channels. In one embodiment, the control tube 1320 can be configured such that after the rotation the pawls can only travel to the bottom position, thus, holding the saddle at the drop position until the user places his weight on the saddle. At his convenience, the user can place his weight on the saddle, pushing down the upper air spring 1360, the saddle mount 1370, and the upper post 1318 to a bottom position, causing the air spring 1355 to compress. In the bottom position, the air spring 1355 can be compressed. In one embodiment, the pawl carrier 1340 can be locked to a bottom pawl locking slot of the control tube 1320 in the bottom position. In the down position, the air spring 1355 can be compressed. Thus, the air spring 1355 is in a high energy state. The pawl carrier 1340 can be locked to a bottom pawl locking slot of the control tube 1320 in a down position. In another embodiment, the control tube 1320 can be configured such that after the rotation the pawls can travel to the bottom position or the top position. Thus, the user let the saddle return to the top position or the user can use his weight on the saddle to depress the saddle to the bottom position.

The control tube 1320 can be rotated to unlock the pawl carrier 1340 from the bottom pawl locking slot of the control tube 1320. The pawls can move into the channels. The air spring 1355 can expand, pushing the upper air spring 1360 into the up position. The pawl carrier 1340 can be locked to the top pawl locking slot of the control tube 1320 in the up position.

Advantageously, a user can manipulate a lever to rotate the control tube 1320 and then wait before pressing the saddle down. Many posts require the user to depress an actuator and simultaneously move the post with body weight before they can release the actuator. This means that the rider must be seated and have weight on the post before they release the actuator. Traditionally if an actuator is released before the post moves, the post will simply stay locked in the up position.

Advantageously, a rider can pre-shift the actuator, then wait until they are in a situation that allows them to weight the saddle and lower the post. From the time the rider presses and releases the actuator the post will be floating—fully extended but only supported by the spring force. Then, when the rider sits, their weight will overcome the spring force and cause the post to move down and lock in the middle position.

In another embodiment, an autodrop seatpost can be supported and actuated hydraulically. For example, an outer seat post structure consists of two telescoping tubes. Within the telescoping structure can be two hydraulic travel adjustment mechanisms that can be placed in a vertical stack arrangement. The two hydraulic travel adjustment mechanisms can also be arranged series. Each travel adjust mechanism can have a piston and a shaft within a sealed, oil filled housing. In order to adjust either travel adjustment mechanism, oil can flow from one side of the piston to the other via a user activated valve, such as a lever. A first travel adjustment mechanism can contain a spring to provide energy for the automatically dropping the seat post a predetermined amount. The second travel adjustment mechanism can be responsive to input energy, i.e., the bodyweight of the rider. In this regard, the second travel adjustment mechanism the rider can apply his bodyweight onto the saddle in order to be activated. The user-applied energy can also be used towards re-energizing the spring in the first travel adjustment mechanism and compressing the air spring that is used for extending the seat post to its original height, as will be described more fully below. The operation of the hands-free, on-the-flow multi-stage height adjustable seat post assembly can include the following stages:

Stage 1: Auto Drop

A lower (first) travel adjust mechanism can have a compressed spring on a top side of a lower travel adjustment piston that, upon opening of a lower valve (such as by user activation of a lever), forces the spring to extend. As the spring extends, the seat post can be pulled downward thereby lowering the saddle a predetermined distance.

Stage 2a: Manual Drop

When the user activates a valve in the upper (second) travel adjust mechanism the valve can open a fluid passageway between a top and a bottom side of a piston. The user can then apply bodyweight to the saddle to cause oil to flow from one side of the piston to the other and drop the saddle height further.

Stage 2b: Re-Energize Auto-Drop Spring

During the manual drop, the user's bodyweight can provide the energy to reset the spring in the lower travel adjust mechanism. As the manual drop is in process, oil can be pumped into the lower travel adjustment system such that it provides sufficient force to compress the spring, resetting the lower travel adjustment mechanism. A series of check valves can allow the lower travel adjustment piston to move in an upward direction against the spring while preventing downward movement due to spring force.

Stage 2c: Energize Extension Spring

During the manual drop, a portion of the piston shaft can extend into a sealed and pressurized volume of air at the top of the seat post. This reduces the volume of air, creating higher pressure and air spring force that can be used for seat post extension.

Stage 3: Extension

In order to extend the seat post to its original position the user can open the lower valve (i.e., activates the lever) for the upper travel adjust mechanism, but is not required to apply bodyweight to the saddle. The air spring, which was energized in the previous step, can push on the upper travel adjustment shaft and biases the travel adjustment mechanism towards its fully extended position.

Figure 14:
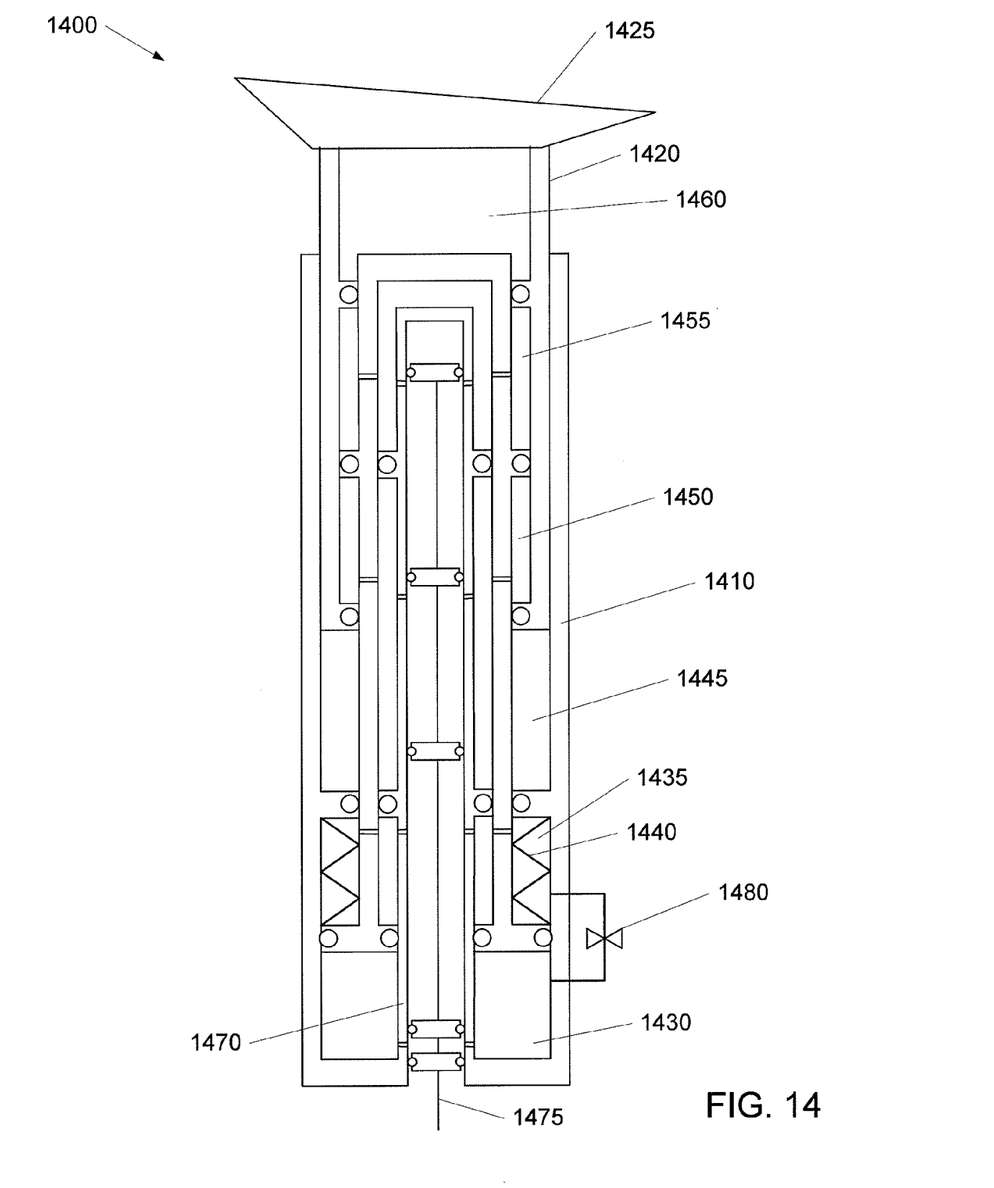
FIG. 14 is a block diagram of a hydraulic autodrop seatpost in accordance with an illustrative embodiment.

Referring to FIG. 14, a block diagram of a hydraulic autodrop seatpost 1400 in accordance with an illustrative embodiment is shown. The hydraulic autodrop seatpost 1400 can include a main tube 1410, an upper tube 1420, a saddle mount 1425, a piston shaft 1430, a valving tube 1470, and a valve tree 1475. The upper tube 1420 can be configured to telescopically mate with the main tube 1410. The saddle mount 1425 can be coupled to the upper tube 1420.

The valving tube 1470 can be coupled to the main tube 1410 and located concentric with an axis of the main tube 1410. The valve tree 1475 can insert into a seal with the valving tube 1470. The valving tube 1470 can include holes that work with the valve tree 1475 to open and close passageways between the holes.

The piston shaft 1430 can seal over the valving tube 1470 and against the main tube 1410. The piston shaft 1430 can include holes that work with the valving tube 1470 and the valve tree 1475 to open and close passageways between the holes. The upper tube 1420 can seal against the piston shaft 1430 and the main tube 1410.

The main tube 1410, the upper tube 1420, the saddle mount 1425, the piston shaft 1430, and the valving tube 1470 can form a plurality of chambers. In one embodiment, the hydraulic autodrop seatpost 1400 can include a first chamber 1430, a second chamber 1435, a third chamber 1445, a fourth chamber 1450, a fifth chamber 1455, and a sixth chamber 1460. The first chamber 1430, the second chamber 1435, the third chamber 1445, the fourth chamber 1450, and the fifth chamber 1455 can be hydraulic chambers filled with oil. The sixth chamber 1460 can be an air chamber.

The first chamber 1430 can be formed by the main tube 1410, the piston shaft 1430, and the valving tube 1470. The second chamber 1435 can be formed by the main tube 1410 and the piston shaft 1430. The second chamber 1435 can include a spring 1440. The spring 1440 can be a compression spring. The third chamber 1445 can be formed by the main tube 1410, the upper tube 1420 and the piston shaft 1430. The fourth chamber 1450 can formed by the upper tube 1420 and the piston shaft 1430. The fifth chamber 1455 can formed by the upper tube 1420 and the piston shaft 1430. The sixth chamber 1460 can formed by the upper tube 1420 and the piston shaft 1430.

In an autodrop operation, the valve tree 1475 can be placed in a first position that can fluidly couple the first chamber 1430 to the second chamber 1435, and can close the fourth chamber 1450 and the fifth chamber 1455. The third chamber 1445 can be open to a reservoir. The spring 1440 can force the piston shaft 1430 down. Since the fourth chamber 1450 and the fifth chamber 1455 are closed, locking the upper tube 1420 to the piston shaft 1430. Consequently, the upper tube 1420 and the saddle mount 1425 can drop to an autodrop position.

In a manual drop operation, the valve tree 1475 can be placed in a second position that can fluidly isolate the first chamber 1430 to the second chamber 1435, fluidly couple the fourth chamber 1450 to the fifth chamber 1455, and connect the third chamber 1445 to the first chamber 1430. The second chamber 1435 can be open to a reservoir. A user can place his weight on a saddle connected to the saddle mount 1425 which can force the upper tube 1420 down. Since the fourth chamber 1450 is fluidly coupled to the fifth chamber 1455, the upper tube 1420 forces fluid out of the third chamber 1445 and into the first chamber 1430, forcing the piston shaft 1430 up. As the piston shaft 1430 travels up, spring 1440 can be reset. In addition, the piston shaft 1430 can extend into the sixth chamber 1460, which can be an air spring, thereby charging the air spring. The passageways can include check valves to prevent the hydraulic autodrop seatpost 1400 from expanding back to the autodrop position.

In a manual drop operation, the valve tree 1475 can be placed in a third position that can fluidly couple the fourth chamber 1450 to the fifth chamber 1455. The air spring of the sixth chamber 1460 can expand, causing the upper tube 1420 to return to a top position.

In other embodiments, various valving arrangements can be used with more or fewer chambers. In addition, the sequencing of the staging and hydraulics can be changed to provide, for example, different drop heights, faster drops, or faster resets.

One or more flow diagrams may have been used herein. The use of flow diagrams is not meant to be limiting with respect to the order of operations performed. The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. An apparatus, comprising:
   a seat post including:
   an upper post;
   a lower post;
   a first mechanical energy source configured to contract the lower post and the upper post;
   a second mechanical energy source configured to expand the lower post and the upper post; and
   a control mechanism configured to activate the first mechanical energy source to contract the lower post and the upper post to a first predetermined position.

2. The apparatus of claim 1, wherein:
   the control mechanism is further configured to activate the second mechanical energy source to expand the lower post and the upper post; and
   the second mechanical energy source is configured to contain more energy than the first mechanical energy source.

\* \* \* \* \*